(12) United States Patent
Wu

(10) Patent No.: US 10,570,945 B2
(45) Date of Patent: Feb. 25, 2020

(54) PRESSING-TYPE SCREW

(71) Applicant: Yi-Chang Wu, Taoyuan (TW)

(72) Inventor: Yi-Chang Wu, Taoyuan (TW)

( * ) Notice: Subject to any disclaimer, the term of this patent is extended or adjusted under 35 U.S.C. 154(b) by 270 days.

(21) Appl. No.: 15/818,983

(22) Filed: Nov. 21, 2017

(65) Prior Publication Data
US 2019/0040899 A1 Feb. 7, 2019

(30) Foreign Application Priority Data

Aug. 4, 2017 (TW) .............................. 106126307 A

(51) Int. Cl.
| F16B 19/08 | (2006.01) |
| F16B 35/04 | (2006.01) |
| F16B 33/00 | (2006.01) |

(52) U.S. Cl.
CPC .......... *F16B 35/041* (2013.01); *F16B 33/006* (2013.01)

(58) Field of Classification Search
USPC ....... 411/508, 510, 502, 392, 411, 418, 419, 411/309, 947
See application file for complete search history.

(56) References Cited

U.S. PATENT DOCUMENTS

| 1,729,670 | A | * | 10/1929 | Holland | ............... | F16B 25/0015 |
| | | | | | | 411/419 |
| 2,257,441 | A | * | 9/1941 | Wylie | ................ | F01M 11/0408 |
| | | | | | | 411/418 |
| 3,240,102 | A | * | 3/1966 | Sandor | ................ | F16B 25/0078 |
| | | | | | | 411/418 |
| 3,552,257 | A | * | 1/1971 | Tanabe | .................... | F16B 35/02 |
| | | | | | | 411/368 |
| 5,186,591 | A | * | 2/1993 | Malks | ................... | F16B 21/088 |
| | | | | | | 411/301 |
| 5,628,601 | A | * | 5/1997 | Pope | ................... | F01M 11/0408 |
| | | | | | | 138/89 |
| 5,692,864 | A | * | 12/1997 | Powell | .................. | F16B 13/002 |
| | | | | | | 411/30 |
| 5,755,543 | A | * | 5/1998 | Culpen | .................... | F16B 35/02 |
| | | | | | | 411/419 |
| 5,947,668 | A | * | 9/1999 | Thommes | ............... | F16B 39/28 |
| | | | | | | 411/304 |
| 6,139,236 | A | * | 10/2000 | Ito | ......................... | F16B 13/002 |
| | | | | | | 408/223 |
| 6,581,896 | B1 | * | 6/2003 | Olexovitch | ............ | A47G 7/044 |
| | | | | | | 248/222.14 |
| 7,954,179 | B2 | * | 6/2011 | Johnson | .................. | E03D 11/16 |
| | | | | | | 4/252.1 |
| 8,469,646 | B2 | * | 6/2013 | Kono | .................... | F16B 21/086 |
| | | | | | | 411/508 |

* cited by examiner

*Primary Examiner* — Gary W Estremsky
(74) *Attorney, Agent, or Firm* — Bacon & Thomas, PLLC

(57) ABSTRACT

A pressing-type screw includes a screw-head component, two first drilling-fastening components, and a drilling-head component. The screw-head component is provided with a fastening slot. The two first drilling-fastening components form an axis passing through the center of the screw-head component. The two first drilling-fastening components each has a top end in connection with the screw-head component, and each includes a first thread portion formed on a surface of each of the two first drilling-fastening components and furthest away from the axis. The drilling-head component is in connection with the bottom end of each of the two first drilling-fastening components. A hollow space is formed between the two first drilling-fastening components and the drilling-head component.

8 Claims, 5 Drawing Sheets

PRESSING-TYPE SCREW

CROSS REFERENCE TO RELATED APPLICATION

This application claims the benefits of the Taiwan Patent Application Serial Number 106126307, filed on. Aug. 4, 2017, the subject matter of which is incorporated herein by reference.

BACKGROUND OF THE INVENTION

1. Field of the Invention

The present invention relates to a pressing-type screw, and more particularly, to a pressing-type screw by designing a structure of hollow space in the screw so as to allow the screw to be pressed and fastened rapidly into an object.

2. Description of Related Art

Various fasteners are employed in the industrial design or interior design, as fixing components, for joining different objects. Namely, holes are drilled at two overlapped objects, and fasteners are used to fasten the same together. The fasteners may include rivets, nails, screws, and so forth, which fall within a mechanical fixing manner.

It is noted that rivets relate to a destructive fixing measure, such that after the objects are fixed, the rivets or the objects are required to be destructed in order to detach the rivets and the objects. Whereas in spite of the fact that the nails and the screws relate to a nondestructive fixing measure, extra tools are necessary for anchoring the nails or the screws into the objects, or otherwise removing the same from the objects.

The nails relate to a structure formed with a sharp point, such that a user applies an external force to insert the nails into the objects so as to incur a frictional force to fix together the objects. In comparison, the screw makes use of the structure formed with an external thread to be engaged with the object so as to fix the same together. Such a screw-fastening effect is much firmer than the fastening effect of a nail. Nevertheless, in the use of the screw to perform an object-fixing work, a screwdriver is required for tightening or releasing the screw, and as a result, time and effort consumptions are necessary.

Given the above, the idea of simplifying installation with a pressing-type screw is conceived, such that by designing a structure of hollow space in the screw so as to allow the screw to be pressed and fastened into the hole of an object without the use of a screwdriver, though the screwdriver is necessary only when the pressing-type screw is to be screwed-off and removed. Through such a simplified screw installation process, working efficiency can be increased effectively. As such, with persistent research and experiments, a "Pressing-Type Screw" can be accomplished eventually.

SUMMARY OF THE INVENTION

To solve the problem given above, an object of the present invention is to provide a pressing-type screw, such that by designing a structure of hollow space in the screw so as to allow the screw to be pressed and fastened into an object, where a screw-installation process can be simplified and the working efficiency can be increased effectively.

To achieve the above-mentioned object, the pressing-type screw, according to the present invention, comprises a screw-head component, two first drilling-fastening components, and a drilling-head component. The screw-head component is provided with a fastening slot. The two first drilling-fastening components form an axis passing through the center of the screw-head component. The two first drilling-fastening components each has a top end in connection with the screw-head component, and each includes a first thread portion formed on a surface of each of the two first drilling-fastening components and furthest away from the axis. The drilling-head component is in connection with the bottom end of each of the two first drilling-fastening components. A hollow space is formed between the two first drilling-fastening components and the drilling-head component.

According to the present invention, the fastening-type screw further comprises a second drilling-fastening component, which is connected with the drilling-head component, and which extends into the hollow space. The second drilling-fastening component includes a second thread portion formed on a surface of the second drilling-fastening component and furthest away from the axis.

Further, according to the present invention, the second drilling-fastening component extends into the hollow space for a length shorter than a length of the hollow space.

Still further, according to the present invention, the second drilling-fastening component has a width shorter than a width of the hollow space.

According to the present invention, the second drilling-fastening component is formed, along the axis, with a surface most approximate to the axis; and is formed, outside of the hollow space, with another surface furthest away from the axis.

Further, according to the present invention, the screw-head component, the two first drilling-fastening components, the drilling-head component, and the second drilling-fastening component are formed integrally as a unitary structure.

According to the present invention, the screw-head component, the two first drilling-fastening components, the drilling-head component, and the second drilling-fastening component may all be made of plastic material.

Further, according to the present invention, the first thread portion and the second thread portion have the same pitch for their threads.

According to the present invention, the two first drilling-fastening components each forms a curved structure, of the same curvature, facing the axis.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
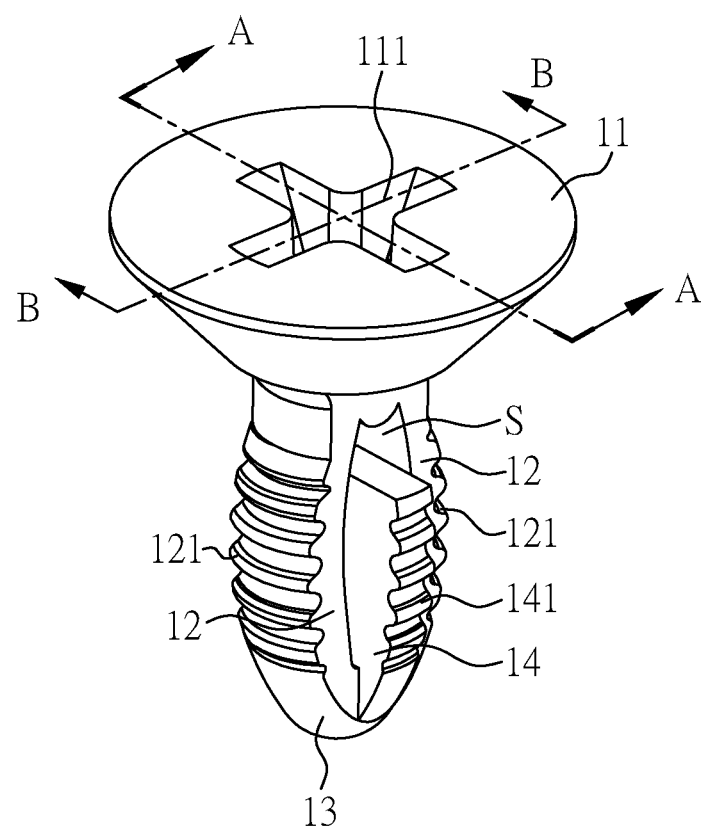
FIG. 1 is a perspective view illustrating a pressing-type screw according to the present invention.
Figure 2A:
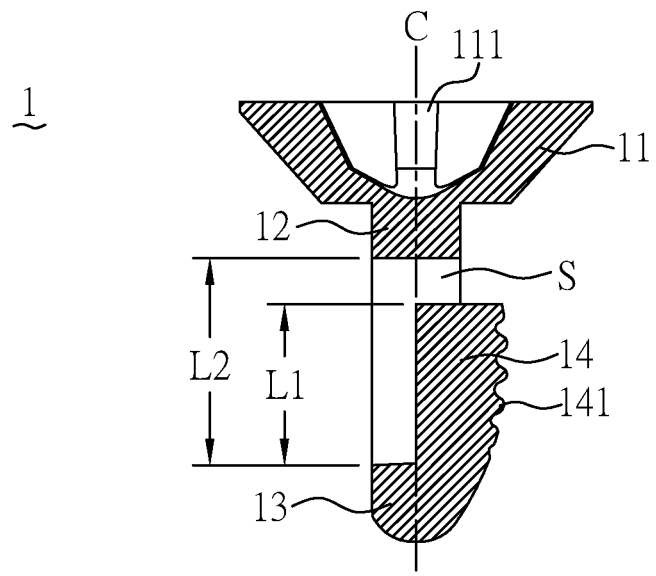
FIG. 2A is a cross-sectional view taken along cutting line A-A of FIG. 1.

References are made to FIG. 1, a perspective view illustrating a pressing-type screw according to the present invention; FIG. 2A, a cross-sectional view taken along cutting line A-A of FIG. 1; and FIG. 2B, a cross-sectional view taken along cutting line B-B of FIG. 1. The pressing-type screw 1 comprises a screw-head component 11, two first drilling-fastening components 12, a drilling-head component 13, and a second drilling-fastening component 14.

According to the present invention, the screw-head component 11 is provided with a fastening slot 111. The two first drilling-fastening components 12 form an axis C passing through the center of the screw-head component 11. The two first drilling-fastening components 12 each has a top end in connection with the screw-head component 11, and each includes a first thread portion 121 formed on a surface of each of the two drilling-fastening components 12 and furthest away from the axis C. The drilling-head component 13 is in connection with the bottom end of each of the two first drilling-fastening components 12. A hollow space S is formed between the two first drilling-fastening components 12 and the drilling-head component 13. The second drilling-fastening component 14 is connected with the drilling-head component 13, and extends into the hollow space S. The second drilling-fastening component 14 includes a second thread portion 141 formed on a surface of the second drilling-fastening component 14 and furthest away from the axis C. The screw-head component 11, the two first drilling-fastening components 12, the drilling-head component 13, and the second drilling-fastening component 14 are formed integrally as a unitary structure.

Figure 2B:
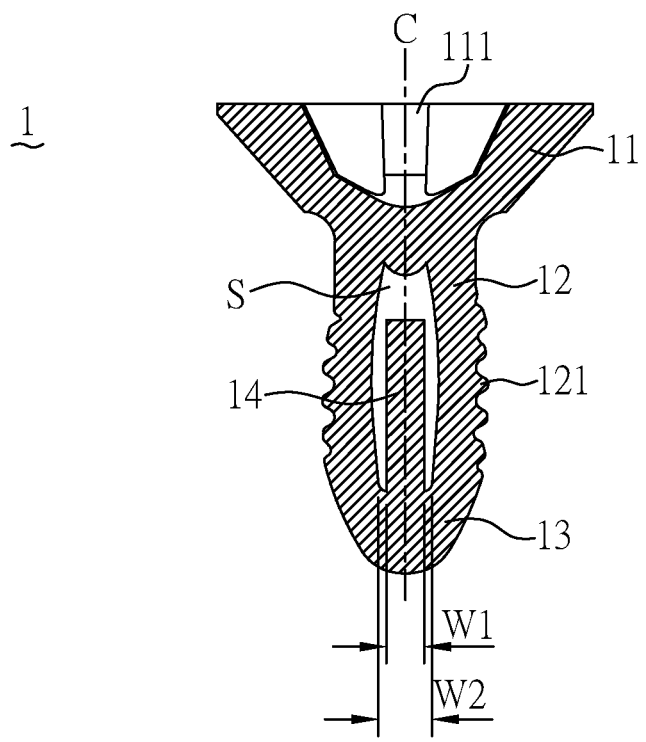
FIG. 2B is a cross-sectional view taken along cutting line B-B of FIG. 1.

As shown in FIG. 2A and FIG. 2B, the second drilling-fastening component 14 extends into the hollow space S for a length L1 shorter than a length L2 of the hollow space S. The second drilling-fastening component 14 has a width W1 shorter than a width W2 of the hollow space S. In other words, the second drilling-fastening component 14 inside of the hollow space S appears a non-contact situation with the two first drilling-fastening components 12. Thereby, in case the two first drilling-fastening components 12 deform, as subject to force, the hollow space S can provide sufficient room allowing deformation of the two first drilling-fastening components 12. Besides, the two first drilling-fastening components 12 each forms a curved structure, of the same curvature, facing the axis C, such that the pressing-type screw 1 can have much more resilience to match holes of dimensions. As such, the fixing work can be performed through deformation, as subject to force, of the two first drilling-fastening components 12.

Further, according to the present invention, the second drilling-fastening component 14 is formed, along the axis C, with a surface most approximate to the axis C; and is formed, outside of the hollow space S, with another surface furthest away from the axis C. In other words, as shown in FIG. 2A for a plane formed by cross-section A-A, the second drilling-fastening component 14 is formed at right side of the axis C, where the first thread portion 121 and the second thread portion 141 have the same pitch for their threads. As such, the second thread portion 141 can strengthen a fixing effect between the pressing-type screw 1 and an object to be fastened.

Figure 3:
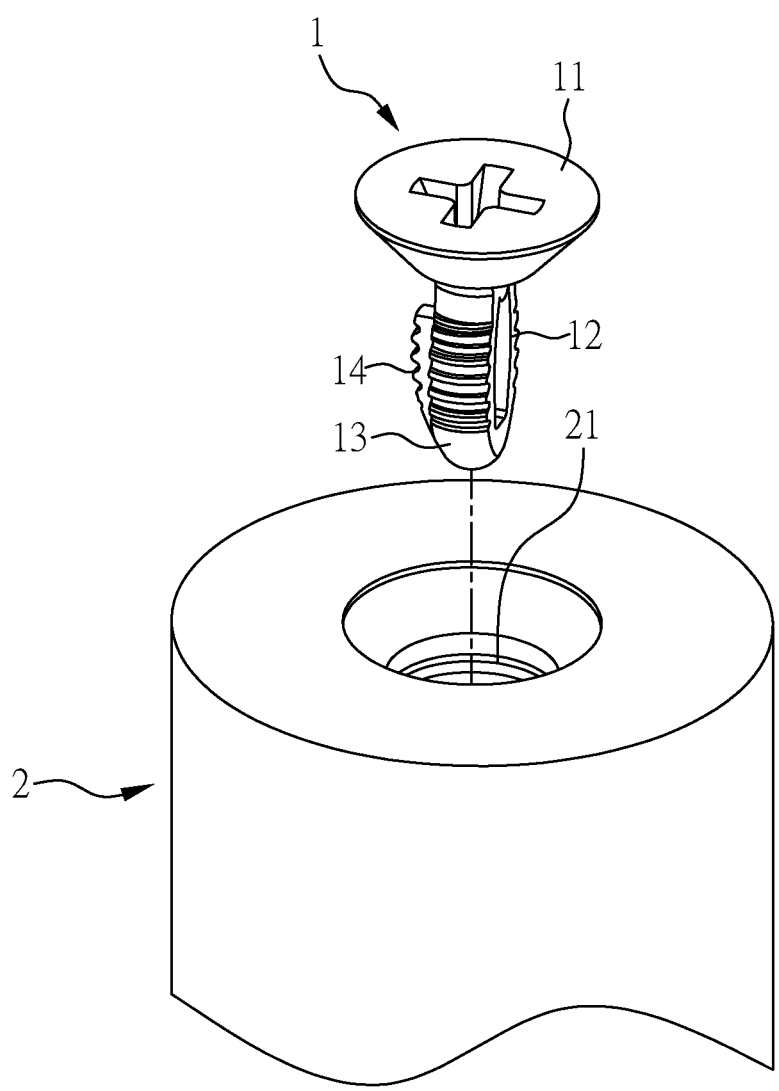
FIG. 3 is a schematic perspective view illustrating the pressing-type screw, according to the present invention, to be fastened into an object.
Figure 4:
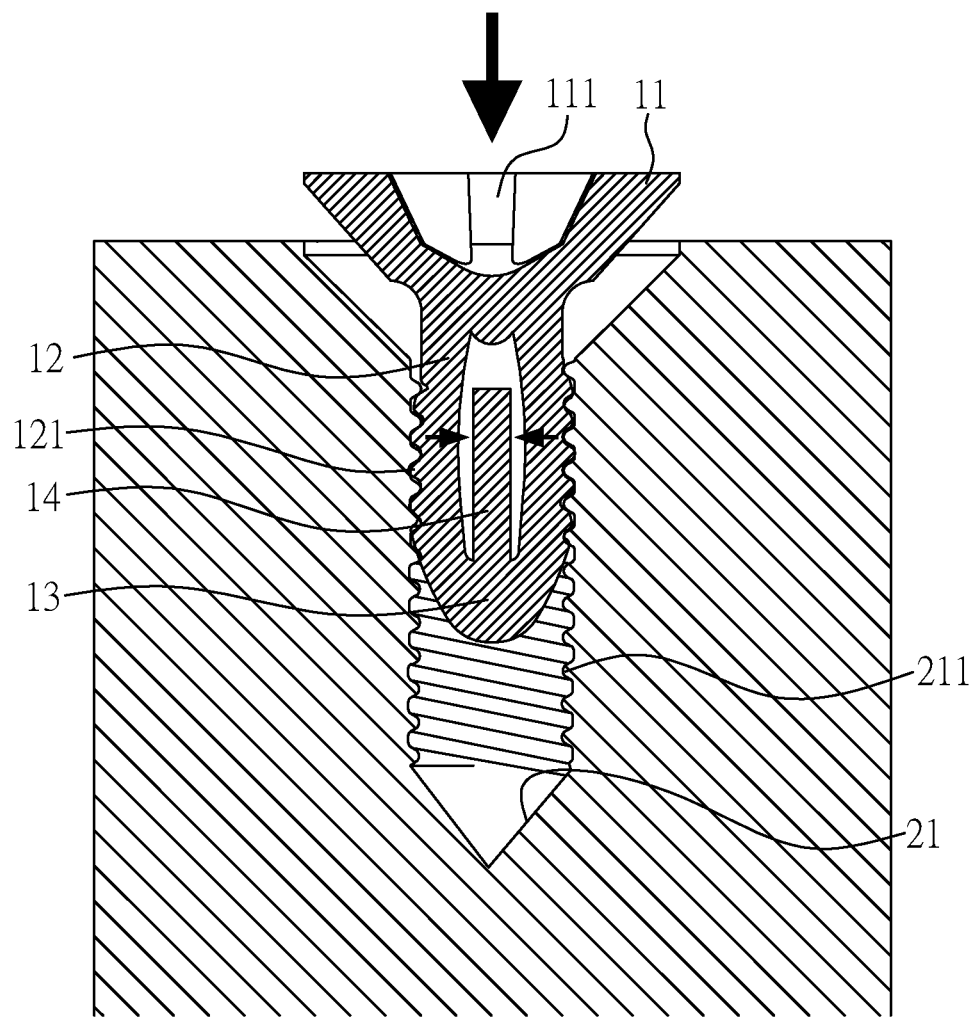
FIG. 4 is a schematic cross-sectional view illustrating the pressing-type screw, according to the present invention, pressed and fastened into the object.
Figure 5:
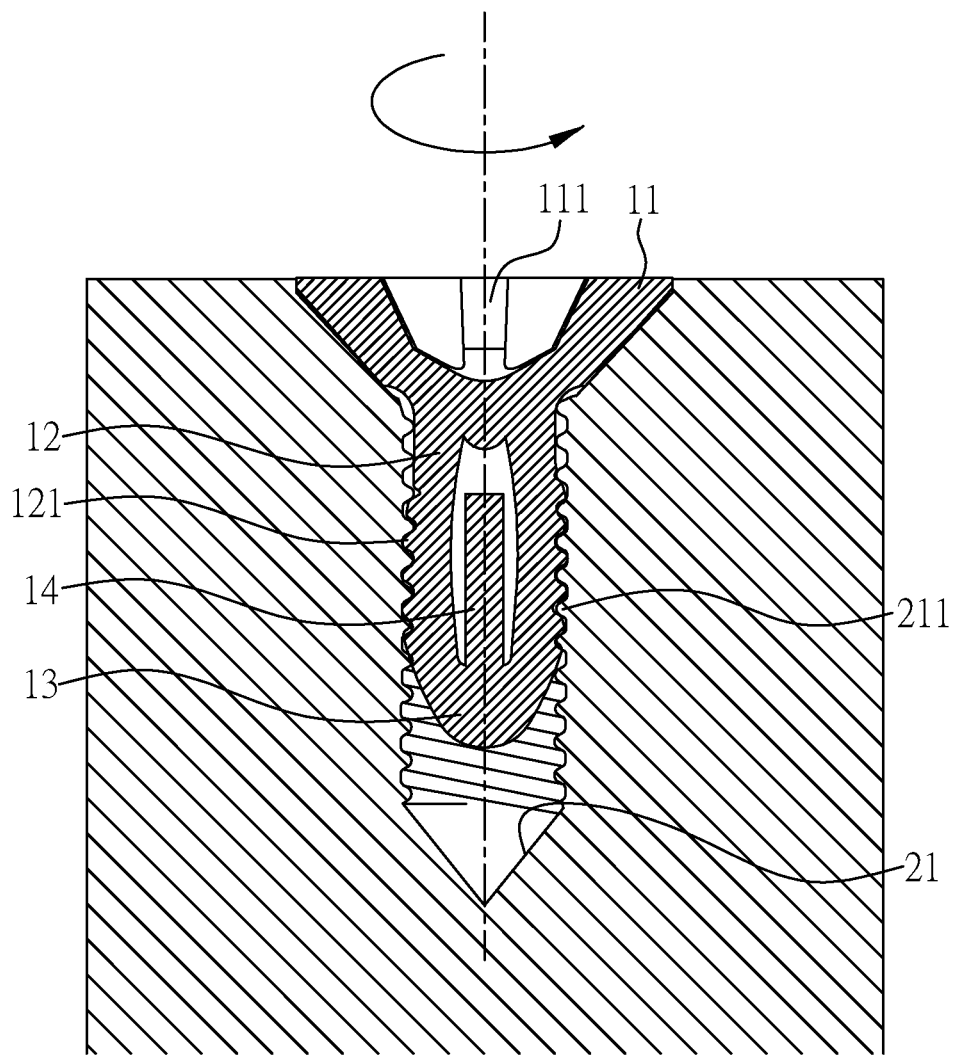
FIG. 5 is a schematic cross-sectional view illustrating the pressing-type screw, according to the present invention, to be screwed-off and removed.

Further, references are made to FIG. 3, a schematic perspective view illustrating the pressing-type screw, according to the present invention, to be fastened into an object; FIG. 4, a schematic cross-sectional view illustrating the pressing-type screw pressed and fastened into the object; and FIG. 5, a schematic cross-sectional view illustrating the pressing-type screw to be screwed-off and removed.

As shown in FIG. 3, the object 2 is provided with a fastening hole 21, where the fastening hole 21 is formed, internally, with a third thread portion 211 corresponding to the first thread portion 121 and the second thread portion 141. Then, as shown in FIG. 4, when a user intends to fix the pressing-type screw 1 into the object 2, the only thing necessary is to align the drilling-head component 13 with the fastening hole 21, and to exert a downward force on the screw-head component 11, so as to fix the pressing-type screw 1 into the fastening hole 21.

According to the present invention, during the process of exerting a downward force on the pressing-type screw 1 so as to press the same into the fastening hole 21, the curved structure formed by the first drilling-fastening components 12 is employed, and in cooperation of such design of hollow space S, the first drilling-fastening components 12 are each deformed and approaches to the axis C. As a result, the first thread portion 121 and the second thread portion 141 can engage with the third thread portion 211 one another smoothly due to the deformation of the first drilling-fastening components 12.

Further, according to the present invention, the screw-head component 11, the two first drilling-fastening components 12, the drilling-head component 13, and the second drilling-fastening component 14 are all made of plastic material. This not only facilitates engaging the object 2 made of plastic or wooden material, but also the curved structure of the first drilling-fastening components 12, together with the plastic material, can produce a resilient recovery force due to deformation of the structure, during engaging one another of the first thread portion 121, the second thread portion 141, and the third thread portion 211. Such resilient recovery force is exerted from the axis C toward the first drilling-fastening components 12, whereas the position of the resilient recovery force exerted is on a surface where the first drilling-fastening components 12 contact the fastening hole 21, thereby the fixing effect of the pushing-type screw 1 can be strengthened. Eventually, in case the pushing-type screw 1 is to be removed, a screwdriver (not shown) is used to inert into the fastening slot 111 of the screw-head component 11 so as to unscrew and remove the pushing-type screw 1.

Still further, according to the present invention, in spite of the fact that, as for a description of exemplification, the fastening hole 21 is provided with the third thread portion 211, it is not necessarily so limited. It is understood that any fastening hole without threads, or any through hole passing through the object 2, can all be applicable. In other words, any holes formed in the object 2 can be applicable for the pushing-type screw 1 to perform a fixing work. Whereas the shape of the fastening slot 111 is not limited to a cross-like slot, and that a "-"-like slot, a hexagonal slot, or a star-like slot will also be applicable so long as the need is practically satisfied.

Given the above, the pressing-type screw 1, according to the present invention employs the first thread portion 121 of each first drilling-fastening component 12 and the second thread portion 141 of the second drilling-fastening component 14 to proceed with the fixing work. Besides, the characteristics of the curved structure and plasticity of the first drilling-fastening components 12, in cooperation with the design of hollow space S, the pressing-type screw 1 can have resilience to match holes of dimensions, and produce a resilient recovery force so as to increase a fixing effect. Such a pressing-fixing manner, according to the present invention, simplifies the conventional installation process using screws to fixing objects, let alone working efficiency can be increased effectively.

Although the present invention has been explained in relation to its preferred embodiments, it is to be understood that many other possible modifications and variations can be made without departing from the scope of the invention as hereinafter claimed.

What is claimed is:

1. A pressing-type screw, comprising:
a screw-head component, provided with a fastening slot;
two first drilling-fastening components, forming an axis passing through the center of the screw-head component, wherein the two first drilling-fastening components each has a top end in connection with the screw-head component, and each includes a first thread portion formed on a surface of each of the two first drilling-fastening components and furthest away from the axis;
a drilling-head component, being in connection with the bottom end of each of the two first drilling-fastening components, and a hollow space being formed between the two first drilling-fastening components and the drilling-head component; and
a second drilling-fastening component, which is connected with the drilling-head component, and which extends into the hollow space, wherein the second drilling-fastening component includes a second thread portion formed on a surface of the second drilling-fastening component and furthest away from the axis.

2. The pressing-type screw as claimed in claim 1, wherein the second drilling-fastening component extends into the hollow space for a length shorter than a length of the hollow space.

3. The pressing-type screw as claimed in claim 1, wherein the second drilling-fastening component has a width shorter than a width of the hollow space.

4. The pressing-type screw as claimed in claim 1, wherein the second drilling-fastening component is formed, along the axis, with a surface most approximate to the axis; and is formed, outside of the hollow space, with another surface furthest away from the axis.

5. The pressing-type screw as claimed in claim 1, wherein the screw-head component, the two first drilling-fastening components, the drilling-head component, and the second drilling-fastening component are formed integrally as a unitary structure.

6. The pressing-type screw as claimed in claim 1, wherein the screw-head component, the two first drilling-fastening components, the drilling-head component, and the second drilling-fastening component are all made of plastic material.

7. The pressing-type screw as claimed in claim 1, wherein the first thread portion and the second thread portion have the same pitch for their threads.

8. The pressing-type screw as claimed in claim 1, wherein the two first drilling-fastening components each forms a curved structure, of the same curvature, facing the axis.

* * * * *